United States Patent
Kondo et al.

(10) Patent No.: US 12,517,269 B2
(45) Date of Patent: Jan. 6, 2026

(54) SCINTILLATOR ARRAY, AND RADIATION DETECTOR AND RADIATION INSPECTION APPARATUS USING THE SAME

(71) Applicants: KABUSHIKI KAISHA TOSHIBA, Tokyo (JP); TOSHIBA MATERIALS CO., LTD., Yokohama (JP)

(72) Inventors: Hiroyasu Kondo, Yokohama (JP); Makoto Hayashi, Chigasaki (JP); Kazumitsu Morimoto, Yokohama (JP)

(73) Assignee: Niterra Materials Co., Ltd., Yokohama (JP)

( * ) Notice: Subject to any disclaimer, the term of this patent is extended or adjusted under 35 U.S.C. 154(b) by 211 days.

(21) Appl. No.: 18/461,716

(22) Filed: Sep. 6, 2023

(65) Prior Publication Data

US 2024/0045083 A1    Feb. 8, 2024

Related U.S. Application Data

(63) Continuation of application No. PCT/JP2022/010117, filed on Mar. 8, 2022.

(30) Foreign Application Priority Data

Mar. 9, 2021 (JP) ................................ 2021-037199

(51) Int. Cl.
*G01T 1/20* (2006.01)
*G01T 1/202* (2006.01)

(52) U.S. Cl.
CPC .......... *G01T 1/2006* (2013.01); *G01T 1/2002* (2013.01); *G01T 1/2023* (2013.01)

(58) Field of Classification Search
CPC ... G01T 1/2006; G01T 1/2002; G01T 1/2023; G21K 2004/04
See application file for complete search history.

(56) References Cited

U.S. PATENT DOCUMENTS

| | | | |
|---|---|---|---|
| 4,543,485 A | * | 9/1985 | Ishii ...................... G01T 1/2002 250/483.1 |
| 5,866,908 A | * | 2/1999 | Novak .................. G01T 1/2002 250/367 |

(Continued)

FOREIGN PATENT DOCUMENTS

| | | |
|---|---|---|
| JP | 6419692 B2 | 11/2018 |
| JP | 2020-173226 A | 10/2020 |

(Continued)

OTHER PUBLICATIONS

Japanese Decision to Grant a Patent (with English translation) dated Jul. 2, 2024 (Application No. 2023-505588).

(Continued)

*Primary Examiner* — Kiho Kim
(74) *Attorney, Agent, or Firm* — BURR PATENT LAW, PLLC (57) ABSTRACT

To provide an X-ray ceramic scintillator array as well as a radiation detector and a radiation inspection apparatus using the same, which prevents a resin used for a reflective layer of the scintillator array from being colored due to X-ray irradiation so as to realize a significant improvement against the output drop of the scintillator array. The resin used for the reflective layer of the X-ray ceramic scintillator array has a feature wherein a ratio of absorption intensity in a wavenumber range of 1490 $cm^{-1}$ to 1750 $cm^{-1}$ to absorption intensity in a wavenumber range of 2500 $cm^{-1}$ to 2990 $cm^{-1}$ has a value that falls within a specific range in an absorption spectrum based on Fourier transform infrared spectrometry (FT-IR).

6 Claims, 3 Drawing Sheets

(56) References Cited

U.S. PATENT DOCUMENTS

| | | | |
|---|---|---|---|
| 5,905,014 A * | 5/1999 | Van de Bergh | C09K 11/02 |
| | | | 430/966 |
| 6,495,845 B1 * | 12/2002 | Tsunota | G01T 1/2006 |
| | | | 250/366 |
| 10,416,319 B2 | 9/2019 | Morimoto et al. | |
| 11,287,538 B2 | 3/2022 | Tanino et al. | |
| 2003/0178570 A1 | 9/2003 | Tsunota et al. | |
| 2003/0236388 A1 | 12/2003 | Armstrong et al. | |
| 2008/0212213 A1 | 9/2008 | Kogure et al. | |
| 2015/0015346 A1 | 1/2015 | Jou et al. | |
| 2015/0153462 A1 | 6/2015 | Fuchs et al. | |
| 2017/0236609 A1 | 8/2017 | Tanino et al. | |
| 2017/0261621 A1 | 9/2017 | Nagata et al. | |
| 2018/0188386 A1 * | 7/2018 | Kondo | G01T 1/2985 |
| 2020/0408936 A1 | 12/2020 | Tanino et al. | |

FOREIGN PATENT DOCUMENTS

| | | |
|---|---|---|
| WO | 2014/162717 A1 | 10/2014 |
| WO | 2016/021540 A1 | 2/2016 |
| WO | 2017/082337 A1 | 5/2017 |
| WO | 2019/181444 A1 | 9/2019 |

OTHER PUBLICATIONS

Extended European Search Report dated Feb. 5, 2025 (Application No. 22767168.2).
International Search Report and Written Opinion (Application No. PCT/JP2022/010117) dated Apr. 26, 2022 (11 pages).
Japanese Office Action (with English translation) dated Feb. 12, 2025 (Application No. 2024-121312).

* cited by examiner

SCINTILLATOR ARRAY, AND RADIATION DETECTOR AND RADIATION INSPECTION APPARATUS USING THE SAME

CROSS-REFERENCE TO RELATED APPLICATION

This application is a Continuation Application of PCT Application No. PCT/JP2022/010117, filed Mar. 8, 2022 and based upon and claiming the benefit of priority from Japanese Patent Application No. 2021-037199, filed Mar. 9, 2021, the entire contents of all of which are incorporated herein by reference.

FIELD

Embodiments of the present invention relate generally to a scintillator array, and a radiation detector and a radiation inspection apparatus using the scintillator array.

BACKGROUND

In the fields of medical diagnosis and industrial nondestructive inspection, etc., inspection with a radiation inspection apparatus such as an X-ray computed tomography apparatus (hereinafter, an "X-ray CT apparatus") is conducted. An X-ray CT apparatus includes an X-ray tube (X-ray source) for emitting fan-shaped beam X-rays and an X-ray detector having many built-in X-ray detection elements in such an arrangement that the X-ray tube and the X-ray detector face each other with a tomographic plane of an inspection subject positioned at the midpoint. Such an X-ray CT apparatus is adapted to radiate fan beam X-rays from the X-ray tube while rotating the X-ray tube around an inspection subject, and to collect X-ray absorption data at the X-ray detector according to transmission through the inspection subject. Tomogram reconstruction is then performed by analyzing the X-ray absorption data with a computer. For the radiation detector in an X-ray CT apparatus, detection elements utilizing a solid scintillator are widely used. In the radiation detector with such solid scintillator-utilizing detection elements, the number of channels are easily increased by downsizing the detection elements, so that the resolution of the X-ray CT apparatus, etc. can be enhanced.

Radiation inspection apparatuses, such as an X-ray CT apparatus, are used in various fields for medical purposes, industrial purposes, and so on. An example of a known X-ray CT apparatus is an apparatus of a multi-slice type in which detection elements, for example, photodiodes, are two-dimensionally arranged in rows and columns and a scintillator array is placed over the detection elements. The multi-slice type enables superposition of slice images, thereby realizing three-dimensionally expressed CT images. The radiation detector mounted on a radiation inspection apparatus includes detection elements arranged in multiple rows and columns, and a scintillator segment for each of these detection elements. An X-ray that has been incident on the scintillator segment is converted into visible light, which is then converted into an electric signal at the detection element for forming an image. It has been a trend in recent years to downsize the detection elements and to also reduce the pitch between the neighboring detection elements for achieving a high resolution. Thus, the scintillator segment is also downsized.

Scintillator segments as discussed above use various scintillator materials, and among such materials, rare earth oxysulfide-based phosphor ceramics show a high light emission efficiency and have suitable characteristics for use as scintillator segments. Accordingly, a radiation detector is becoming popular which combines ceramic scintillator segments obtained by subjecting a sintered body (ingot) of the scintillator material, i.e., rare earth oxysulfide-based phosphor ceramics, to processes such as cutting or grooving, with photodiodes serving as detection elements.

An example of a known scintillator that uses phosphor ceramics is a ceramic scintillator constituted by a sintered gadolinium oxysulfide phosphor. An array of ceramic scintillators is prepared, for example, in the following manner. First, the scintillator material, i.e., rare earth oxysulfide-based phosphor in a powder form, is molded into a given shape and sintered to obtain a sintered body (ingot). This sintered body of the scintillator material is cut into a plate which is one size larger than the scintillator array to be formed, and then subjected to cutting processes such as grooving to form scintillator segments corresponding to multiple detection elements. Further, reflective layers are formed between the scintillator segments, and the scintillator segments are integrated to provide a scintillator array.

These reflective layers between the scintillator segments may be formed using a metal such as molybdenum, but at present, reflective layers are generally formed by filling spaces between the segments with a slurry in which a white pigment such as titanium oxide is dispersed in a transparent resin, followed by curing. Such reflective layers, as well as the scintillator, are subject to X-ray irradiation over the long term, and therefore, they are preferably resistant to deterioration caused by X-rays.

DETAILED DESCRIPTION

A scintillator for use in X-ray CT, etc., has a structure to confine, using reflective layers, light generated by an X-ray within a pixel so that the light is efficiently taken out to the photodiode side. It is generally the case that the reflective layers include a reflective layer completely filling the space between scintillator segments and, in some cases, a further reflective layer formed on the X-ray incident surface side to cover the scintillator array (the latter is also called a "top reflective layer"). Light at the scintillator caused by an X-ray is efficiently guided to the photodiode directly or via such reflective layers. As the transparent resin in the reflective material, a mixture of an epoxy resin and a titanium oxide is often used. An epoxy resin tends to be colored (yellowed) upon long-term X-ray irradiation, and the colored epoxy resin then absorbs light produced by the conversion at the scintillator and causes a drop in the optical output. As taught in Patent Document 1 (Japanese Patent No. 6,419,692), a resin constituted by a mixture of a white pigment and an amine-based epoxy resin has been widely used as a reflective material in view of dimensional precision for inter-pixel pitches and easy-to-handle properties. An epoxy resin, in general, has a low resistance to climatic conditions and degrades its reflectance once it is colored due to X-ray irradiation, and as such, a problem of decreasing the optical output of scintillators has been inherent in the use of an epoxy resin.

Patent Document 2 (International Publication No. 2017/082337) discloses a technique of setting a glass transition point and further a thermal expansion coefficient of a transparent resin used for the reflective layer to be within given ranges in order to improve the dimensional precision of a scintillator array during manufacture and during use of the array. It is also described that a transparent resin having no C=C bond in its molecular structure is preferred as the transparent resin satisfying these conditions and showing less yellow coloring due to X-ray irradiation.

Patent Document 3 (Jpn. Pat. Appln. KOKAI Publication No. 2020-173226) similarly teaches that the use of a specific epoxy resin, curing agent, etc. would be effective against the output drop caused by the X-ray-irradiation-induced coloring of a reflective layer in a scintillator array. It can be supposed that, with these techniques of Patent Documents 1 to 3, some improvements have been made against the deterioration of reflective layers in scintillator arrays caused by the coloring due to X-ray irradiation; however, enhanced diagnostic accuracy of medical devices is an ever-present demand, and a better-than-before performance has always been desired.

The present embodiment uses, as a transparent resin for forming a reflective material of the reflective layers filling the spaces between scintillator segments, a resin without a C=C bond but having a C=O bond in its molecular structure in such a manner that the resin is mixed with a pigment differing in refractive index from the resin or mixed with air bubbles so as to be whitened. The resin has a feature wherein the ratio of absorption intensity in a wavenumber range of 1490 cm$^{-1}$ to 1750 cm$^{-1}$ to absorption intensity in a wavenumber range of 2500 cm$^{-1}$ to 2990 cm$^{-1}$ has a value that falls within a specific range in an absorption spectrum analysis based on Fourier transform infrared spectrometry (FT-IR).

According to an embodiment of the present invention, a scintillator array including at least two scintillator segments and a first reflective layer disposed between the two scintillator segments is provided. The first reflective layer contains a resin having a C=O bond.

According to another embodiment of the present invention, a scintillator array including at least two scintillator segments and a first reflective layer disposed between the at least two scintillator segments is provided. The first reflective layer has an absorption peak in a wavenumber region 1 of 1490 cm$^{-1}$ to 1750 cm$^{-1}$ and an absorption peak in a wavenumber region 2 of 2500 cm$^{-1}$ to 2990$^{-1}$, based on the infrared spectroscopy. A peak area ratio of the wavenumber region 1 to the wavenumber region 2 is 0.01 to 4.

It has been found that adopting a specific resin for inclusion in the reflective layers of a scintillator array can realize significant reduction of the coloring caused by X-ray irradiation.

Embodiments for implementing a scintillator array, a radiation detector, and a radiation inspection apparatus according to the present invention will be described.

(Ceramic Scintillator Array)

Figure 1:
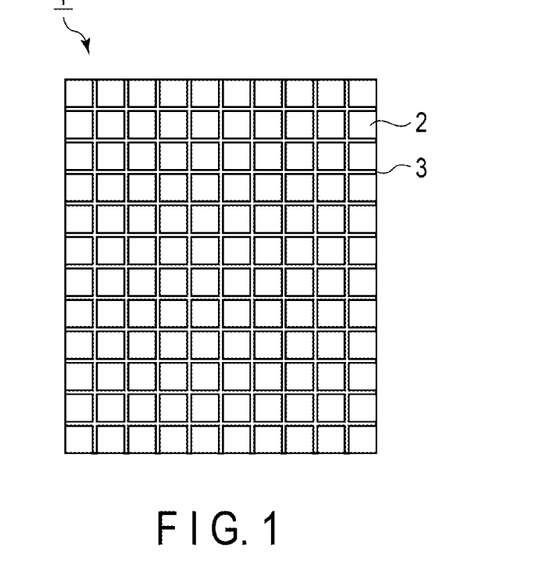
FIG. 1 is an explanatory diagram showing a scintillator array (illustration of a top reflective layer (a second reflective layer) is omitted).

FIG. 1 is a plan view showing a ceramic scintillator array according to an embodiment. In the figures, "1" denotes a scintillator array, "2" denotes a scintillator segment, and "3" denotes a first reflective layer. The scintillator array 1 includes multiple scintillator segments 2. The first reflective layer 3 is interposed between the neighboring scintillator segments 2. Each first reflective layer 3 is bonded to its adjacent scintillator segments 2. The multiple scintillator segments 2 are integrated by the first reflective layer 3 to which they are bonded. In other words, the scintillator array 1 has a structure in which the multiple scintillator segments 2 are integrated using the first reflective layers 3. Also, a second reflective layer (not illustrated in FIG. 1) is formed to cover the whole of each scintillator segment.

Figure 2A:
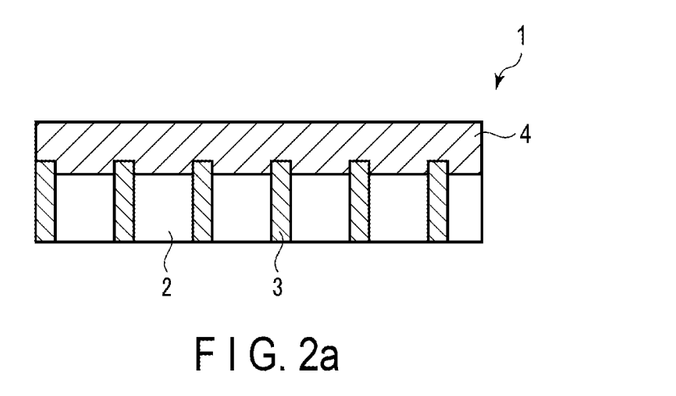
FIG. 2a is a sectional view of a scintillator array according to the present embodiment.
Figure 2B:
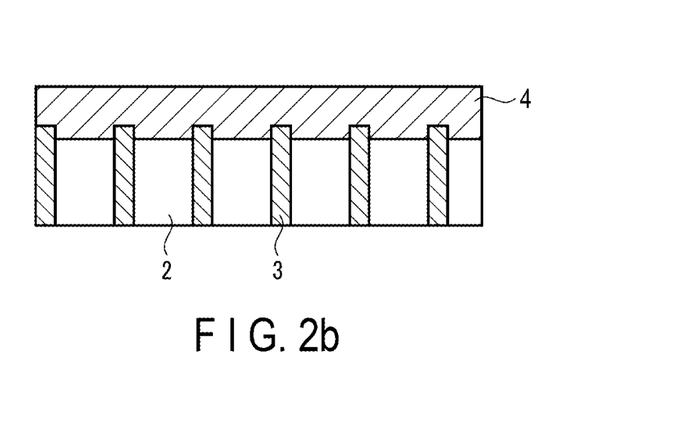
FIG. 2b is a sectional view of the scintillator array according to the present embodiment.
Figure 2C:
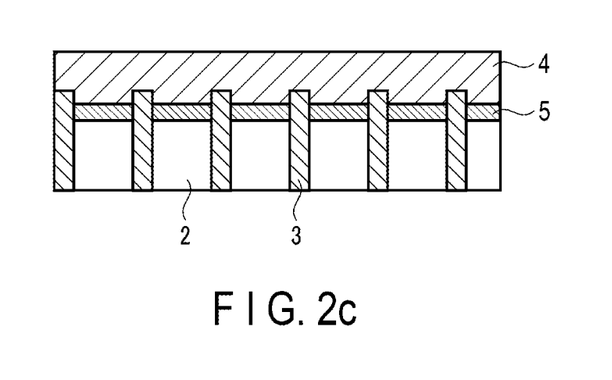
FIG. 2c is a sectional view of the scintillator array according to the present embodiment.

FIGS. 2a to 2c show three sectional configurations of the scintillator array according to the present embodiment. FIG. 2a illustrates the first reflective layers 3 each interposed between the scintillator segments, and a second reflective layer 4 disposed on the X-ray incident side in such a manner as to cover the entire scintillator array. The second reflective layer here has been formed by applying and curing a reflective material. FIG. 2b resembles FIG. 2a but shows a configuration in which the first reflective layer 3 interposed between the scintillator segments further has a portion intruding into the inner part of the second reflective layer 4. The configuration will be described in more detail. The first reflective layer 3 has a shape projecting in the direction of the second reflective layer 4 from the upper surface of the array, that is, has a protrusion toward the second reflective layer 4 side. The distance (thickness) from the upper surface of the array to the upper surface of the second reflective layer 4 at the position of the protrusion is smaller than the maximum thickness of the second reflective layer 4. With this configuration, the second reflective layer can be prevented from peeling off from the scintillator array. In FIG. 2c, the second reflective layer 4 that has been formed beforehand into a sheet shape from a resin containing reflective particles is bonded via an adhesive layer 5. Similar to FIG. 2b, FIG. 2c shows a configuration in which the first reflective layer 3 interposed between the scintillator segments has a portion intruding into the inner part of the second reflective layer 4 through the adhesive layer 5. Details of the configuration are as follows. The first reflective layer 3 has a shape projecting in the direction of the second reflective layer 4 from the upper surface of the array, that is, has a protrusion toward the second reflective layer 4 side. The adhesive layer 5 is formed beneath the lower surface of the second reflective layer 4 and contacts a portion of the protrusion of the first reflective layer 3 near its upper end. The distance (thickness) from the upper surface of the array to the upper surface of the second reflective layer 4 at the position of the protrusion is smaller than the maximum thickness of the second reflective layer 4. Using the structures of FIG. 2b and FIG. 2c, the peeling-off of the second reflective layer can be further suppressed, and a more preferred form can be realized. A photodiode array for detecting the visible light converted from an X-ray by the scintillator is bonded on the side opposite to the X-ray incident side, thereby forming a radiation detector according to the present embodiment.

The scintillator array 1 may have either a structure in which the multiple scintillator segments 2 are arranged in line, or a structure in which the multiple scintillator segments 2 are two-dimensionally arranged in a predetermined number in the row and column directions as shown in FIG. 1. In the case where the multiple scintillator segments 2 are two-dimensionally arranged, the respective first reflective layers 3 are provided between the scintillator segments 2 arranged in the row direction and between the scintillator segments 2 arranged in the column direction. The number of the scintillator segments 2 is discretionarily set according to the structure, resolution, etc. of the radiation detector such as an X-ray detector.

The scintillator segments 2 are made of a sintered body of a rare earth oxysulfide phosphor, a sintered body of a garnet structure oxide, etc. The scintillator segments 2 are formed of one sintered body, or two or more sintered bodies. Examples of the rare earth oxysulfide phosphor ceramics include a rare earth oxysulfide phosphor containing praseodymium (Pr) as an activator. Examples of the rare earth oxysulfide constituting the phosphor ceramics include an oxysulfide of a rare earth element or elements which may be yttrium (Y), gadolinium (Gd), lanthanum (La), lutetium (Lu), and so on. Examples of the garnet structure oxide include a gadolinium gallium aluminum garnet (GGAG), a lutetium aluminum garnet (LuAG), a lutetium gallium aluminum garnet (LuGAG), a gadolinium aluminum garnet (GdAG), a gadolinium gallium aluminum garnet (GdGAG), and so on. A lutetium gallium aluminum garnet (LuGAG) is preferred.

In the ceramic scintillator array 1 according to an embodiment, the scintillator segment 2 is preferably made of rare earth oxysulfide phosphor ceramics (a scintillator material) having a composition represented by General formula: $RE_2O_2S{:}Pr$     (1)

in which RE represents at least one element selected from the group consisting of Y, Gd, La, and Lu.

Among the aforementioned rare earth elements, Gd particularly has a large X-ray absorption coefficient, and would contribute to an improvement in the optical output of the ceramic scintillator array 1. It is therefore further preferable to use a $Gd_2O_2S{:}Pr$ phosphor for the scintillator segment 2 according to an embodiment. Note that a part of Gd may be substituted with a different rare earth element or elements. In such instances, the amount of Gd substituted by other rare earth element or elements is preferably equal to or less than 10 mol %.

That is, in the ceramic scintillator array 1 according to an embodiment, it is desirable to use, for the scintillator segment 2, the rare earth oxysulfide phosphor ceramics substantially represented by General formula: $(Gd_{1-X}RE_X)_2O_2S{:}Pr$     (2)

in which RE represents at least one element selected from the group consisting of Y, La, and Lu, and X represents a number (atomic ratio) satisfying $0 \leq X \leq 0.1$.

In the ceramic scintillator array 1 according to an embodiment, praseodymium (Pr) is used as an activator for increasing the optical output of the rare earth oxysulfide phosphor ceramics (the scintillator material). Further, Pr is expected to provide an afterglow suppressing effect, etc., as compared to other activators. Therefore, the rare earth oxysulfide phosphor ceramics (the scintillator material) containing Pr as an activator is effective as a fluorescence producing means in the radiation detector.

Preferably, the Pr content in the rare earth oxysulfide phosphor ceramics is in the range of 0.001 to 10 mol % with respect to the phosphor host (e.g., $RE_2O_2S$ which may be $Gd_2O_2S$). The Pr content that exceeds 10 mol % would conversely incur a drop in the optical output. A Pr content less than 0.001 mol % would not permit its effect as a main activator to be sufficiently exerted. The Pr content is more preferably in the range of 0.01 to 1 mol %.

In addition to the main activator Pr, the rare earth oxysulfide phosphor ceramics for use in an embodiment may contain, as a co-activator, a trace amount of at least one element selected from the group consisting of Ce, Zr, and P. These elements are effective in suppressing the degradation due to exposure, suppressing the afterglow, and so on. The sum of the contents of these co-activators is preferably in the range of 0.00001 to 0.1 mol % with respect to the phosphor host.

Furthermore, the sintered scintillator body which forms the scintillator segments 2 according to an embodiment is preferably made of rare earth oxysulfide-based phosphor ceramics (the scintillator material) having a high purity. An impurity could be a cause of the sensitivity degradation of the scintillator, and therefore, it is preferable that the amount of impurities be kept low as much as possible. In particular, a phosphate radical ($PO_4$) causes sensitivity degradation, and its content should preferably be adjusted to 100 ppm or less. In instances where a high density is attained from the use of a fluoride or the like as a sintering aid, a sensitivity degradation could be incurred due to the sintering aid remaining as an impurity.

The scintillator segment 2 is made of a cubic or rectangular-parallelepiped sintered body. Preferably, the scintillator segment 2 has a volume equal to or less than 1 $mm^3$. Downsizing the scintillator segment 2 allows for higher-definition properties of detected images. The sizes of the respective length (L), width (S), and height (T) of the scintillator segment 2 are not necessarily limited, but they are each preferably equal to or less than 1 mm. If the volume of the scintillator segment 2 is reduced to 1 $mm^3$ or smaller, the width (W) of the first reflective layer 3 may be reduced to 100 μm or less, or may be further reduced to 50 μm or less. A width (W) of less than 40 μm, however, could complicate the manufacturing processes, and thus, the width (W) of the first reflective layer 3 is preferably 40 μm or more.

In the ceramic scintillator array 1 according to an embodiment, the first reflective layers 3 for integrating the multiple scintillator segments 2 contain a transparent resin and reflective particles dispersed in the transparent resin. As the transparent resin, at least one of an epoxy resin, a silicone resin, unsaturated polyester, polyurethane, an acrylic resin, polyethylene terephthalate, an epoxy-modified silicone, and/or glycidyl ether is contained. As the reflective particles, any one of air bubbles or a pigment including a titanium oxide, an alumina oxide, a barium sulfate, a zinc oxide, a zirconium oxide, and/or a silicon oxide is contained. Air bubbles contained in the resin may also serve as the reflective particles. The reflective layer 4 which covers the ceramic scintillator array 1 may employ the same transparent resin and the same reflective particles as those of the first reflective layers 3. Note that an epoxy resin, an epoxy-modified silicone, and glycidyl ether in their cured form obtained with an acid anhydride curing agent each contain a $C{=}O$ bond. The other resins, i.e., a silicone resin, unsaturated polyester, polyurethane, an acrylic resin, and polyethylene terephthalate, each contain a $C{=}O$ bond.

Examples of the acid anhydride curing agent include a hydrogenated methyl nadic acid anhydride, an ethylene glycol bis(anhydrotrimellitate), a methyl tetrahydrophthalic anhydride, an acid anhydride, a trimellitic anhydride, a dodecenyl succinic anhydride, a benzophenone tetracarboxylic anhydride, a methyl tetrahydrophthalic anhydride, a methyl hexahydrophthalic acid, a trialkyl tetrahydrophthalic anhydride maleic acid adduct, a 4-methyl hexahydrophthalic anhydride, 3-methyl hexahydrophthalic anhydride, a trialkyl tetrahydrophthalic anhydride, a methyl tetrahydrophthalic anhydride, a chlorendic anhydride, a hexahydrophthalic anhydride, a tetrahydrophthalic anhydride, a succinic anhydride, a 3 or 4-methyl 1,2,3,6-tetrahydrophthalic anhydride, a 3 or 4-methyl-hexahydrophthalic anhydride, a methyl-3, 6-endomethylene-1,2,3,6-tetrahydrophthalic anhydride, a maleic anhydride, a phthalic anhydride, a pyrolitic anhydride, a methylcyclohexene tetracarboxylic dianhydride, a glycerin bis(anhydrotrimellitate) monoacetate, an aliphatic dibasic acid polyanhydride, and so on. One acid anhydride curing agent, or two or more acid anhydride curing agents may be used.

In general, resins tend to be colored (yellowed) by X-rays, and such coloring induces absorption of light produced within a scintillator and consequently causes a drop in the optical output. Still, the degree of yellowing varies depending on the skeletons of resins. According to Fourier transform infrared spectrometry (FT-IR), absorption attributable to C=O in ester groups, carboxyl groups, keto groups (ketone groups), etc. takes place in the band (wavenumber region 1) of 1490 $cm^{-1}$ to $1750^{-1}$. Also, absorption attributable to a C—H bond is observed in the band (wavenumber region 2) of 2500 $cm^{-1}$ to $2990^{-1}$. It has been found, through the results of extensive experiments, that reflective materials involving a small degree of color change due to X-rays preferably have a ratio of the absorption peak area in the wavenumber region 1 to the absorption peak area in the wavenumber region 2, namely, a peak area ratio, within a certain range.

Figure 3:
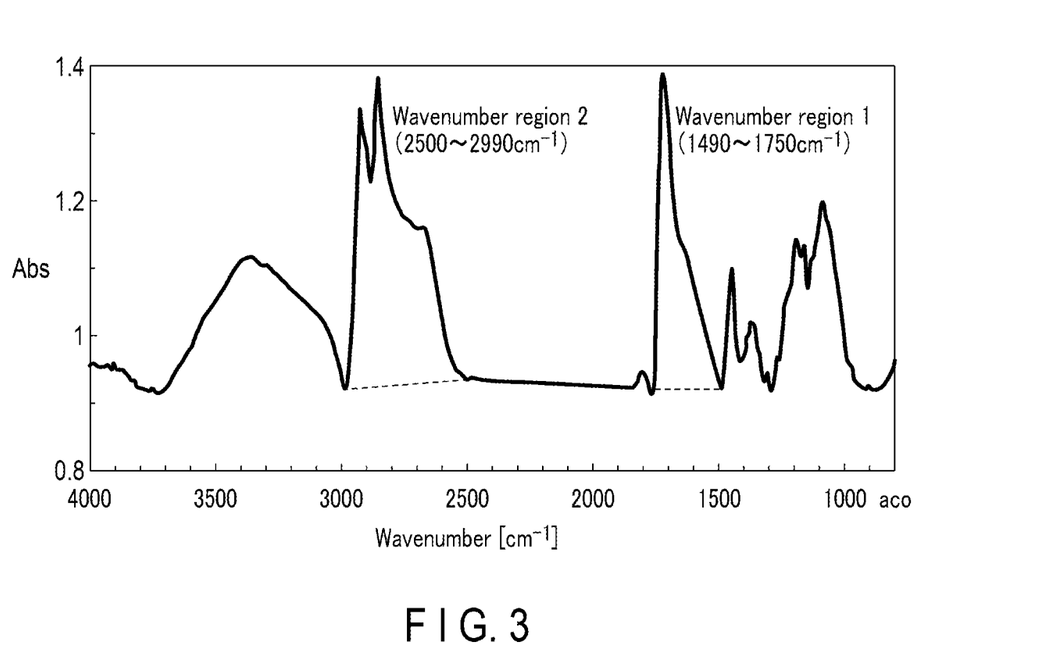
FIG. 3 is a diagram showing an absorption spectrum based on Fourier transform infrared spectroscopy (FT-IR), for reflective layers according to the present embodiment.

FIG. 3 shows an infrared absorption spectrum based on the Fourier transform infrared spectroscopy (FT-IR) for the reflective layers in the scintillator array according to the present embodiment. Absorption peaks are observed in the band (wavenumber region 1) of 1490 $cm^{-1}$ to 1750 $cm^{-1}$ and the band (wavenumber region 2) of 2500 $cm^{-1}$ to $2990^{-1}$, respectively, and these peaks are not attributable to the pigment contained, but to the resin. The absorption peak area refers to the area above the dotted baseline indicated in FIG. 3. The present embodiment can have, as the ratio of the absorption peak area in the wavenumber region 1 to the absorption peak area in the wavenumber region 2, a value in the range of 0.01 to 4. The ratio is preferably 3.6 or less. More preferably, the ratio is in the range of 0.1 to 2.5. The infrared absorption spectrum as shown in FIG. 3 can be easily measured upon peeling off the reflective layer from the scintillator array, cutting off a part of the reflective layer, or in other manners.

The proportions of the transparent resin and the reflective particles forming the first reflective layers 3 and the second reflective layer 4 are preferably such that the mass ratio of the transparent resin is 15 to 60% and the mass ratio of the reflective particles is 40 to 85%, assuming that the sum of the mass ratio of the transparent resin and the mass ratio of the reflective particles is 100%. The mass ratio of the reflective particles being less than 40% would lower the reflection efficiency of the reflective layers, and it is likely that the reflective layers would have a reflection efficiency of less than 90% for light having a wavelength of 512 nm. The mass ratio of the reflective particles being greater than 85%, even though it would not alter the reflection efficiency of the reflective layers, would cause a decrease in the relative mass ratio of the transparent resin, which would consequently hamper stable solidification of the reflective layers.

In instances where the ceramic scintillator array 1 according to an embodiment adopts a configuration of bonding the preformed second reflective layer, the adhesive layer employs a resin containing at least an epoxy resin, a silicone resin, an acrylic resin, a urethane resin, and/or a polyester resin, and having a property of becoming cured upon application of light, heat, or moisture. The adhesive layer may be a transparent resin, and the adhesive layer may contain any one of air bubbles or a pigment including a titanium oxide, an alumina oxide, a barium sulfate, a zinc oxide, a zirconium oxide, and/or a silicon oxide.

The scintillator array according to the present embodiment is manufactured in the following manner. Description will be given with reference to, by way of example, FIG. 2c showing one preferred configuration. In the first step, a white sheet of a predetermined size is prepared from a resin, such as epoxy, containing a white reflective material or materials. For the white sheet, a mixture of reflective particles and a transparent resin, a lacquer coating material, etc. are usable. Such a mixture of reflective particles and a transparent resin preferably has a constitution similar to that of the reflective layers provided between the scintillator segments. The white sheet may be a commercially available product, such as a white PET film. The white sheet will serve as the second reflective layer of the scintillator array, and has a thickness in the range of 50 to 500 μm. The second reflective layer having a thickness of less than 50 μm would not permit the effect of improving the reflection efficiency to be sufficiently exerted. The second reflective layer having a thickness exceeding 250 μm would decrease the transmittable X-ray amount and deteriorate the detection sensitivity. Meanwhile, a scintillator material such as rare earth oxysulfide-based phosphor ceramics is separately cut into a thin plate or thin plates of a predetermined size (with a thickness of 0.5 to 2 mm) to be bonded to the white sheet. The thin plate or thin plates, i.e., a single ceramic plate or multiple ceramic plates, are bonded to the white sheet by an epoxy resin, a thermoplastic adhesive, etc., with their edge faces made to abut on each other in the case of multiple ceramic plates. A gap at the boundary created at the abutting preferably has a width smaller than the width of grooving performed in the second step.

In the second step, a grooving process is performed by dicing. The width of a groove is in the range of 40 to 200 μm. The groove is formed from the side of the ceramic scintillator material and through the ceramic scintillator material and the adhesive layer, and further reaches the inside of the white sheet. The grooving position is adjusted so that the boundary face where the multiple ceramic plates abut on each other is processed into the groove. Portions of the inter-segment reflective layers (the first reflective layers) are provided so as to fill the grooves inside the white sheet, which endows an anchor effect and makes it possible to prevent the top reflective layer (the second reflective layer) from peeling off. The third step is a step of providing the reflective layers in the grooves formed in the second step.

The reflective particles, and an uncured-state resin composition for constituting the transparent resin (an uncured transparent resin) are first prepared, and the grooves between the scintillator segments are filled with a mixture of the reflective particles and the uncured-state resin composition. The uncured-state resin composition preferably has a viscosity of 0.2 to 1 Pa·s (200 to 1000 cps). The viscosity of the resin composition being less than 0.2 Pa·s gives a high fluidity, which would degrade the workability of filling the spaces between the scintillator segments. The viscosity of the resin composition exceeding 1 Pa·s gives a low fluidity, which would degrade the coating performance or filling performance. The transparent resin preferably has a total light transmittance of 85% or higher. The total light transmittance of the transparent resin being lower than 85% would easily degrade the reflection efficiency of the reflective layers.

After filling the spaces between the multiple scintillator segments with the mixture of the reflective particles and the uncured-state resin composition, the resin composition in the mixture is cured so that the reflective layers are formed. The curing treatment for the mixture is discretionarily set according to types, etc. of the uncured-state resin composition, a curing agent, etc. For example, if a thermosetting resin composition is used, the curing reaction is promoted through heat treatment. In some cases, a resin composition such as a two-pack (two-liquid) type epoxy resin is left at room temperature to allow the curing reaction to proceed. Next, as the fourth step, the scintillator array according to the present embodiment is completed by conducting peripheral part processing for the removal of unwanted portions from the peripheral part and further a polishing process.

(Radiation Detector)

Figure 4:
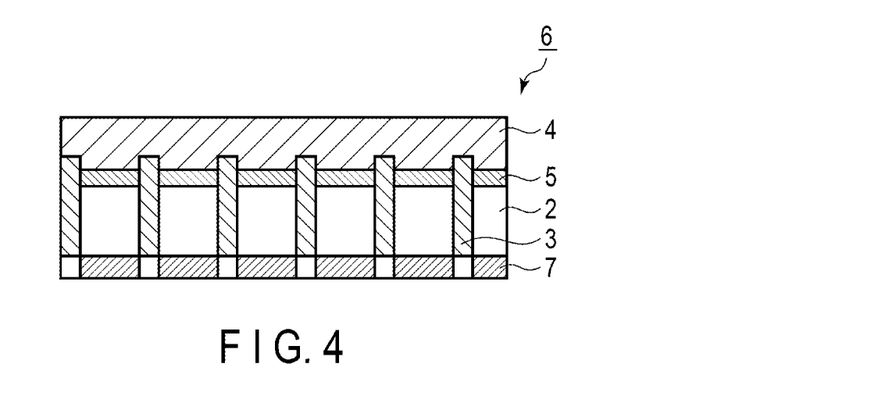
FIG. 4 is a diagram showing a radiation detector according to the present embodiment.

The radiation detector according to an embodiment includes the ceramic scintillator array 1 of the foregoing embodiment as a fluorescence generating means for emitting light in response to an incident radiation, and further includes a photoelectric conversion means for receiving light from the fluorescence generating means and converting the optical output into an electric output. FIG. 4 shows an X-ray detector as one example of the radiation detector according to the embodiment. The X-ray detector 6 shown in FIG. 4 includes the ceramic scintillator array 1 as the fluorescence generating means, and photoelectric conversion elements 7, which may be photodiodes, as the photoelectric conversion means. This ceramic scintillator array 1 has a comparable configuration to that described with reference to FIG. 2c. Thus, its description will be omitted while using the same reference numerals as those used in FIG. 2c.

The ceramic scintillator array 1 has an X-ray incident surface, and a surface which is opposite the X-ray incident surface and on which the photoelectric conversion elements 7 are integrally provided. Examples that may be used as the photoelectric conversion elements 7 include a photodiode. The photoelectric conversion elements 7 are arranged to correspond to the respective scintillator segments 2 constituting the ceramic scintillator array 1. The radiation detector is thus constituted.

(Radiation Inspection Apparatus)

Figure 5:
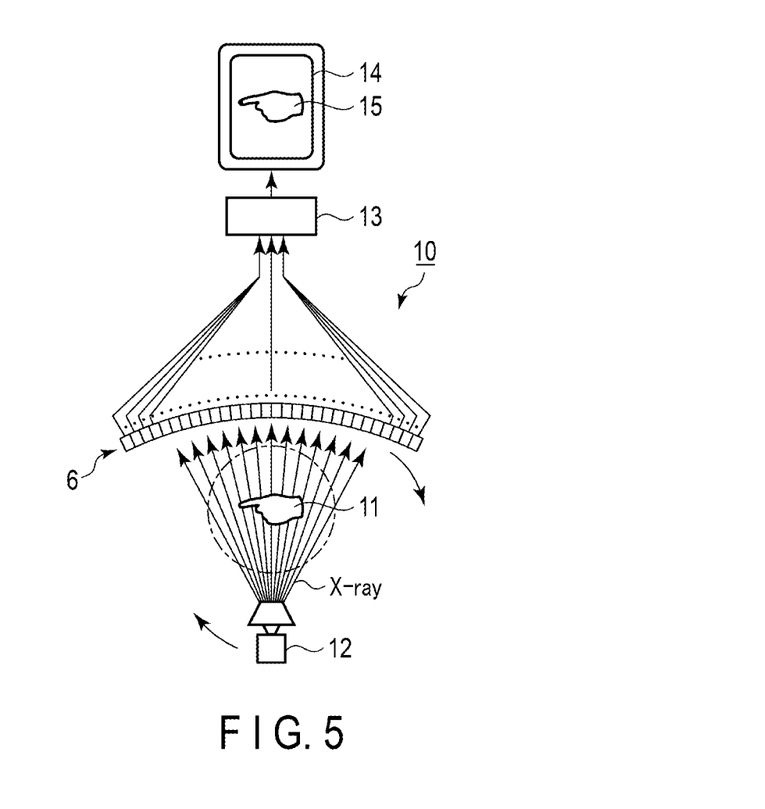
FIG. 5 is a diagram showing a radiation inspection apparatus according to the present embodiment.

The radiation inspection apparatus according to an embodiment includes a radiation source for emitting a radiation toward an inspection subject, and a radiation detector for detecting the radiation that has transmitted through the inspection subject. As the radiation detector, the radiation detector according to the foregoing embodiment is used. FIG. 5 shows an X-ray CT apparatus 10 as one example of the radiation inspection apparatus according to the embodiment. FIG. 5 uses "10" to denote the X-ray CT apparatus, "11" to denote a subject, "12" to denote an X-ray tube, "13" to denote a computer, "14" to denote a display, and "15" to denote a subject image. The X-ray CT apparatus 10 includes the X-ray detector 6 according to an embodiment. In one example, the X-ray detector 6 is attached to an inner wall surface of a cylinder where an imaged part of the subject 11 is arranged. The X-ray tube 12 for emitting X-rays is disposed at the substantial center of the arc of the cylinder to which the X-ray detector 6 is attached. The subject 11 is disposed between the X-ray detector 6 and the X-ray tube 12. The X-ray detector 6 is provided with collimators (not illustrated in the figure) on its X-ray incident surface side.

The X-ray detector 6 and the X-ray tube 12 are adapted to rotate around the subject 11 while performing X-ray imaging. Image information on the subject 11 is three-dimensionally collected from different angles. Signals acquired by the X-ray imaging (electric signals converted by the photoelectric conversion elements) are processed by the computer 13 and displayed as the subject image 15 on the display 14. The subject image 15 is, for example, a tomogram of the subject 11. It is also possible to form the X-ray CT apparatus 10 as a multi-tomogram type using the scintillator array 1 in which the scintillator segments 2 are two-dimensionally arranged as shown in FIG. 1. Such a configuration enables simultaneous acquisition of multiple tomograms of the subject 11 and, for example, a three-dimensional representation of the imaging result as well.

The X-ray CT apparatus 10 shown in FIG. 5 includes the X-ray detector 6 having the ceramic scintillator array 1 according to an embodiment. The ceramic scintillator array 1 according to the embodiment provides an excellent optical output since it has a high reflection efficiency for the visible light emitted from the scintillator segments 2 based on the configurations, etc. of the first reflective layers 3 and the second reflective layer 4 as described above. Use of the X-ray detector 6 having such a scintillator array 1 can reduce the imaging time of the X-ray CT apparatus 10. As a result, the exposure time for the subject 11 can be shortened, and a reduced exposure can be realized. The radiation inspection apparatus (the X-ray CT apparatus 10) according to the embodiment is applicable not only to X-ray inspections for medical diagnosis of human bodies, but also to X-ray inspections for animals, X-ray inspections for industrial use, and so on. Moreover, it also contributes to an improved accuracy, etc. in inspections by nondestructive X-ray inspection apparatuses.

EXAMPLES

Next, a description will be given of concrete examples of the present embodiment and their evaluation results.

Examples 1 to 6; Comparative Examples 1 to 2

Resin materials were each mixed with 60 wt % of a titanium oxide (CR-90 manufactured by Ishihara Sangyo Kaisha, Ltd.) to prepare cured objects. Infrared absorption spectra of the prepared cured objects were obtained based on FT-IR (FT/IR-6600 manufactured by JASCO Corporation), and areas of the peak in a range of 1490 to 1750 $cm^{-1}$ and the peak in a range of 2500 to 2990 $cm^{-1}$ were calculated. The area ratio of the peak in a range of 1490 to 1750 $cm^{-1}$ to the peak in a range of 2500 to 2990 $cm^{-1}$ was calculated. Also, the prepared cured objects were subjected to X-ray irradiation of 4.2 kGy, and a reflectance (an average of reflectance values obtained at wavelengths 510 nm and 670 nm) of the irradiated part and that of the non-irradiated part were measured and the difference therebetween was calculated as a reflectance falling rate. Results are shown in Table 1. The reflectance falling rate (%) will be described in more detail. The reflectance of the X-ray irradiated part and that of the non-irradiated part were each measured at wavelengths 510 nm and 670 nm, using a spectral reflectometer. An average of the reflectance values at the two wavelengths measured for each part was calculated, and the reflectance of the non-irradiated part was subtracted from the reflectance of the X-ray irradiated part to obtain the difference (the falling rate in %). The reflectance falling rate due to X-ray irradiation tends to be smaller as the area ratio based on the Fourier transform infrared spectroscopy (FT-IR) is smaller.

The cured objects in Examples 1 to 6 each include a C=O bond. In contrast, the cured objects in Comparative Examples 1 and 2 do not include a C=O bond.

TABLE 1

|  | Resin material | Peak area ratio | Reflectance falling rate (%) of X-ray irradiated part with respect to X-ray non-irradiated part |
|---|---|---|---|
| Ex. 1 | Epoxy-modified silicone + acid anhydride curing agent | 1.82 | −4.5% |
| Ex. 2 | Unsaturated polyester | 0.46 | −4.2% |
| Ex. 3 | Polyurethane | 1.44 | −1.6% |
| Ex. 4 | Glycidyl ether + acid anhydride curing agent | 1.90 | −5.3% |
| Ex. 5 | Glycidyl ether + acid anhydride curing agent | 2.34 | −4.2% |
| Ex. 6 | Glycidyl ether + acid anhydride curing agent | 3.6 | −5.0% |
| Comp. Ex. 1 | Glycidyl ether + amine curing agent | 4.51 | −7.3% |
| Comp. Ex. 2 | Glycidyl ether + cationic curing agent | 7.97 | −6.2% |

Examples 8 and 9; Comparative Examples 3 and 4

Scintillator arrays were formed using the resins in Examples 1 and 4 and Comparative Examples 1 and 2. A phosphor powder having a composition of $Gd_2O_2S$:Pr (with a Pr concentration=0.05 mol %) was temporarily molded by a rubber press, and this temporarily molded object was degassed and sealed in a capsule made of Ta and then set in an HIP treatment apparatus. Argon gas was charged in the HIP treatment apparatus as a pressurizing agent, and treatment was conducted for 3 hours under the pressure condition of 147 MPa and the temperature condition of 1425° C. A cylindrical sintered body having a size of about an 80 mm diameter×about a 120 mm height was thus prepared. GOS ceramic plates were cut out from the sintered body.

Two GOS ceramic plates each having a length of 70 mm, a width of 22 mm, and a thickness of 2 mm were made to abut on each other at their long sides, and a white PET film (with a thickness of 100 μm, manufactured by Mitsubishi Chemical Corporation) having an area one size larger than the two GOS ceramic plates was bonded to their surfaces using an epoxy adhesive. The bonding was performed in such a manner as to stack the GOS ceramic plates, the epoxy adhesive, and the white PET sheet, apply a load of 16 kg, and heat them at 100° C. for bonding. After cooling to room temperature, the load was removed and a stack having a 70 mm length and a 44 mm width was completed.

The GOS ceramic plate surface of this stack was subjected to a grooving process by dicing. The grooves here were formed with a depth of 2.1 mm. The formed grooves reached the white PET sheet. The grooving position was adjusted so that the boundary between the two ceramic plates was processed into the groove. The resin materials in Examples 1 and 4 and Comparative Examples 1 and 2 mixed with a titanium oxide were poured into the grooves, thermally cured, and polished. The peripheral parts were then cut off, and thereby scintillator arrays having a length of 66 mm, a width of 40 mm, and a thickness of 1.99 mm and corresponding to FIG. 2c were prepared.

With the scintillator arrays according to the present embodiment, where the resin having a small ratio (peak area ratio) of the absorption peak area in the wavenumber region 1 (1490 $cm^{-1}$ to 1750 $cm^{-1}$) to the absorption peak area in the wavenumber region 2 (2500 $cm^{-1}$ to 2990 $cm^{-1}$) based on the Fourier transform infrared spectrometry (FT-IR) is used for the reflective layers, it was confirmed that the drop in an optical output due to X-ray irradiation was suppressed as demonstrated by the Examples and in contrast to the Comparative Examples. There is no doubt that the measures taken by the present embodiment are effective for its goal.

TABLE 2

|  | Material used | Drop rate of optical output |
|---|---|---|
| Ex. 8 | Epoxy-modified silicone + acid anhydride curing agent | 20% |
| Ex. 9 | Glycidyl ether + acid anhydride curing agent | 25% |
| Comp. Ex. 3 | Glycidyl ether + amine curing agent | 32% |
| Comp. Ex. 4 | Glycidyl ether + cationic curing agent | 28% |

The embodiments as originally filed will be set forth.

[1] A ceramic scintillator array formed from a sintered body of a rare earth oxysulfide phosphor, the ceramic scintillator array comprising: a plurality of scintillator segments; and a reflective layer provided between the scintillator segments so as to integrate the scintillator segments, the ceramic scintillator array characterized in that the reflective layer comprises a resin not containing a C=C bond, and a reflective material constituting the reflective layer has an absorption peak in a wavenumber region 1 of 1490 $cm^{-1}$ to 1750 $cm^{-1}$ and an absorption peak in a wavenumber region 2 of 2500 $cm^{-1}$ to 2990 $cm^{-1}$ based on infrared spectroscopy, wherein a peak area ratio of the wavenumber region 1 to the wavenumber region 2 is 0.01 to 4.

[2] The ceramic scintillator array according to [1], characterized in that an inter-segment reflective layer and a top reflective layer in the ceramic scintillator array contain at least one of an epoxy resin, a silicone resin, unsaturated polyester, polyurethane, an acrylic resin, and/or polyethylene terephthalate, and contain any one of air bubbles or a pigment including a titanium oxide, an alumina oxide, a barium sulfate, a zinc oxide, a zirconium oxide, and/or a silicon oxide.

[3] The ceramic scintillator array according to any of [1] and [2], characterized in that a top reflective layer is attached via an adhesive layer.

[4] The ceramic scintillator array according to any of [1] to [3], characterized in that the rare earth oxysulfide phosphor comprises a composition represented by General formula: $RE_2O_2S$:Pr, wherein RE is at least one selected from the group consisting of Y, Gd, La, and Lu, and a Pr content with respect to $RE_2O_2S$ is 0.001 mol % or more and 10 mol % or less.

[5] A radiation detector comprising the ceramic scintillator array according to any of [1] to [4].

[6] A radiation inspection apparatus comprising the radiation detector according to [5].

INDUSTRIAL APPLICABILITY

With the scintillator array according to the present embodiment, a drop in an optical output due to X-ray irradiation can be suppressed, and as such, the scintillator array is industrially useful.

REFERENCE SIGNS LIST

1 . . . Scintillator array
2 . . . Scintillator segment
3 . . . Reflective layer between scintillator segments
4 . . . Reflective layer (second reflective layer) attached to the scintillator array on the X-ray incident surface side
5 . . . Adhesive layer
6 . . . X-ray detector
7 . . . Photoelectric conversion element While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A scintillator array comprising:
at least two scintillator segments; and
a first reflective layer provided between the at least two scintillator segments,
wherein the first reflective layer has an absorption peak in a wavenumber region 1 of 1490 $cm^{-1}$ to 1750 $cm^{-1}$ and an absorption peak in a wavenumber region 2 of 2500 $cm^{-1}$ to 2990 $cm^{-1}$, based on infrared spectroscopy, and
a peak area ratio of the wavenumber region 1 to the wavenumber region 2 is 0.01 to 4.

2. The scintillator array according to claim 1, wherein the peak area ratio of the wavenumber region 1 to the wavenumber region 2 is 3.6 or less.

3. The scintillator array according to claim 1, further comprising a second reflective layer provided above the at least two scintillator segments and the first reflective layer and comprising a resin which is equal to that of the first reflective layer.

4. The scintillator array according to claim 1, wherein the at least two scintillator segments comprise a rare earth oxysulfide phosphor or a garnet structure oxide phosphor.

5. A radiation detector comprising the scintillator array according to claim 1.

6. A radiation inspection apparatus comprising the radiation detector according to claim 5.

* * * * *